United States Patent
Eyal et al.

(10) Patent No.: US 10,104,078 B1
(45) Date of Patent: Oct. 16, 2018

(54) METHOD AND APPARATUS FOR ASSOCIATING SIM CARD WITH A GROUP OF MOBILE COMMUNICATIONS DEVICES

(71) Applicant: MOTOROLA SOLUTIONS, INC., Chicago, IL (US)

(72) Inventors: Eilon Eyal, Kibbutz Dafna (IL); Shay Avivi, Modiin (IL); Yakir Nahum, Netanya (IL); Yossi Mizrahi, Airport City (IL)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

(21) Appl. No.: 15/670,557

(22) Filed: Aug. 7, 2017

(51) Int. Cl.
| | |
|---|---|
| *H04L 29/06* | (2006.01) |
| *H04M 1/67* | (2006.01) |
| *H04W 12/04* | (2009.01) |
| *H04W 12/06* | (2009.01) |
| *H04W 12/08* | (2009.01) |
| *G06F 21/64* | (2013.01) |
| *G06F 21/62* | (2013.01) |
| *H04W 12/10* | (2009.01) |
| *H04W 4/50* | (2018.01) |

(Continued)

(52) U.S. Cl.
CPC ...... *H04L 63/0876* (2013.01); *G06F 21/6209* (2013.01); *G06F 21/64* (2013.01); *H04M 1/67* (2013.01); *H04W 4/50* (2018.02); *H04W 12/04* (2013.01); *H04W 12/06* (2013.01); *H04W 12/08* (2013.01); *H04W 12/10* (2013.01); *G06F 2221/2149* (2013.01); *G06F 2221/2153* (2013.01); *H04W 8/265* (2013.01); *H04W 88/02* (2013.01)

(58) Field of Classification Search
CPC ..... H04L 63/0876; H04M 1/67; H04W 12/04; H04W 12/06; H04W 12/08; H04W 12/10; H04W 8/265; H04W 88/02; H04W 4/50; G06F 21/64; G06F 21/6209; G06F 2121/2149; G06F 2121/2153
See application file for complete search history.

(56) References Cited

U.S. PATENT DOCUMENTS

| 8,095,132 B2 | 1/2012 | Cheng et al. |
| 9,338,647 B2 * | 5/2016 | Spitz ............ H04M 1/675 |

(Continued)

OTHER PUBLICATIONS

Global System for Mobil Communications, 3rd Generation Partnership Project; Technical Specification Group Services and System Aspects; Personalisation of Mobile Equipment (ME); Mobile functionality specification, 3GPP TS 22.022 V4.0.0 technical specification (Mar. 2001) pp. 1-22.

*Primary Examiner* — Khai M Nguyen
(74) *Attorney, Agent, or Firm* — Michael Best & Friedrich LLP (57) ABSTRACT

Method and apparatus for associating a subscriber identity module to a group of mobile communications devices is provided. One embodiment provides a method including receiving the hashed value from the SIM card and decrypting, using the trusted electronic processor, the hashed value based on a second key stored on the mobile communications device to generate a response. The method also includes sending, using the trusted electronic processor, the response to the SIM card and receiving, at the trusted electronic processor, an acknowledgement from the SIM card indicating that the response matches an expected response.

18 Claims, 5 Drawing Sheets

(51) Int. Cl.
*H04W 8/26* (2009.01)
*H04W 88/02* (2009.01)

(56) References Cited

U.S. PATENT DOCUMENTS

| | | | |
|---|---|---|---|
| 2010/0299748 A1 | 11/2010 | Johansson et al. | |
| 2014/0037093 A1* | 2/2014 | Park | H04L 9/0816 380/277 |
| 2015/0163056 A1* | 6/2015 | Nix | H04L 9/0869 380/46 |
| 2015/0350411 A1* | 12/2015 | Blom | H04W 12/06 455/411 |

* cited by examiner

METHOD AND APPARATUS FOR ASSOCIATING SIM CARD WITH A GROUP OF MOBILE COMMUNICATIONS DEVICES

BACKGROUND OF THE INVENTION

Organizations may issue mobile communications devices such as mobile telephones and two-way radios to the organization's employees or members. For example, a public safety agency such as a police department may issue two-way radios to the police officers employed by the police department. These mobile communications devices include a subscriber identity module (SIM) card provided by a network operator. The SIM card allows the mobile communications devices to access a communication network operated by the network operator.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION OF THE INVENTION

Typically, a SIM card provided by the network operator may be operated on any mobile communications device. For example, the SIM card may be operated on an organization-issued mobile telephone and a personal mobile telephone of a user. One concern with these SIM cards is that a user may remove a SIM card from an organization issued mobile communications device and use it with a personal mobile communications device. Although some organizations want to prevent a SIM card from being used with unauthorized mobile communications devices, they may still want the SIM card to be able to be used by any mobile communications device belonging to the organization.

In order to prevent the SIM card from being used on an unauthorized mobile communications device, the mobile communications device may be locked or associated with a single SIM card or a single communication network or the SIM card may be locked or associated with a user. However, these techniques do not allow for using a SIM card with multiple authorized mobile communications devices within the organization.

In some embodiments, a SIM card may be associated with a single mobile communications device. In these embodiments, when the SIM card is first inserted into the mobile communications device, the SIM card reads and stores the mobile communications device's International Mobile Equipment Identity (IMEI). Once the IMEI is stored in the SIM card, the IMEI may only be erased by using a dedicated SIM programmer and an administrator password. The SIM card allows operation only when the mobile communications device's IMEI is the same as the one stored in the SIM card. Putting the SIM card into another mobile communications device, even if the mobile communications device is authorized by the organization, prevents operation of the SIM card. Accordingly, this method requires an administrator operation when the SIM card is transferred between authorized mobile communications devices. The administrator operation may require that the SIM card be taken into a dedicated lab each time the SIM is transferred between mobile communications devices.

One embodiment provides a mobile communications device including a an application electronic processor and a trusted electronic processor coupled to the application electronic processor. The trusted electronic processor is configured to receive, from a subscriber identity module (SIM) card, a hashed value generated based on a random value, a first key, and a hash function and decrypt the hashed value using a second key to generate a response. The trusted electronic processor is also configured to send the response to the SIM card and receive an acknowledgement from the SIM card indicating that the response matches an expected response.

Another embodiment provides a method for associating a subscriber identity module (SIM) card to a group of mobile communications devices including receiving, at a trusted electronic processor of a mobile communications device, the hashed value from the SIM card and decrypting, using the trusted electronic processor, the hashed value based on a second key stored on the mobile communications device to generate a response. The method also includes sending, using the trusted electronic processor, the response to the SIM card and receiving, at the trusted electronic processor, an acknowledgement from the SIM card indicating that the response matches an expected response.

Figure 1:
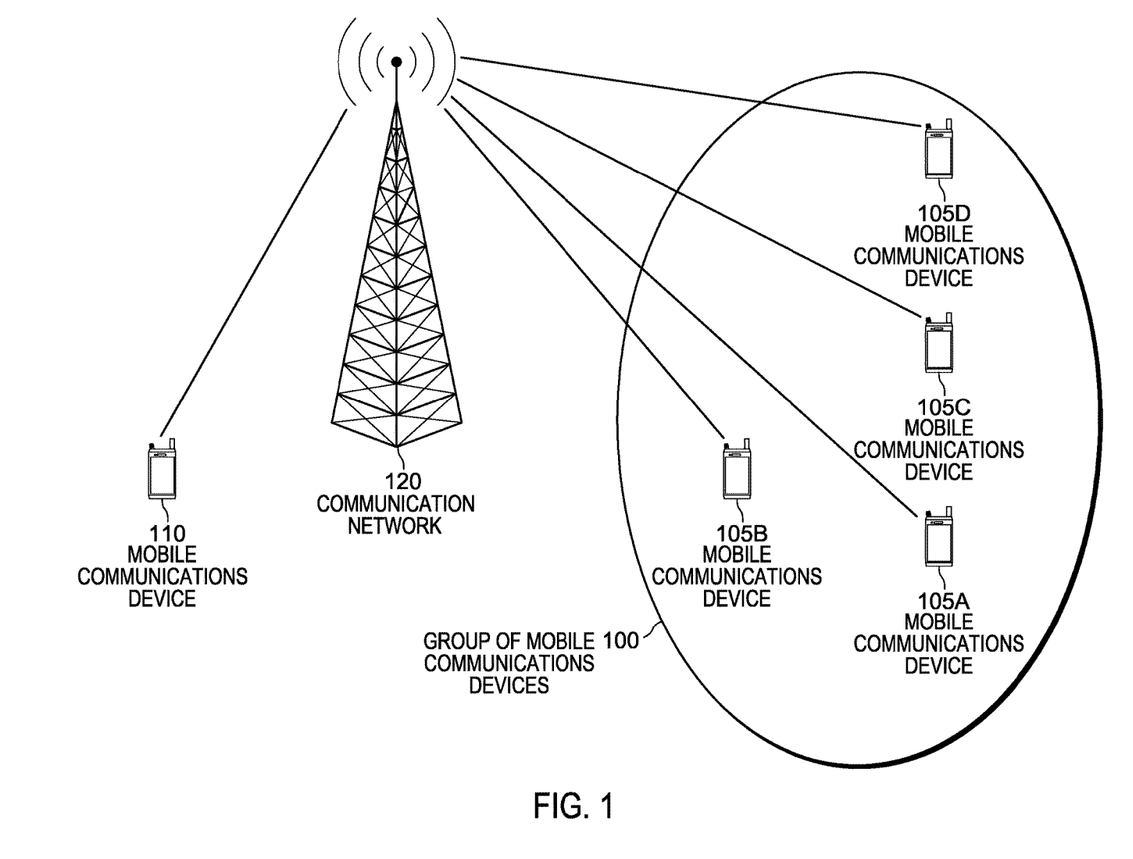
FIG. 1 is a diagram of a group of mobile communications devices in accordance with some embodiments.

FIG. 1 is a diagram of one embodiment of a group of mobile communications devices 100. The group of mobile communications devices 100 includes a plurality of mobile communications devices 105A through 105D, which may singularly be referred to as a mobile communications device 105. The group of mobile communications devices 100 may include one or more mobile communications devices 105 issued by an organization or authorized to be used by personnel of the organization. For example, the group of mobile communications devices 100 may be issued by a public safety organization such as a police department. The group of mobile communications devices 100 may include more or fewer than the four mobile communications devices 105A through 105D illustrated. FIG. 1 also illustrates a mobile communications device 110 not associated with the group of mobile communications devices 100. The mobile communications device 105 may be, for example, a personal device associated with a user rather than an organization-issued mobile communications device 105. The mobile communications devices 105A through 105E may communicate with other mobile communications devices (for example, the mobile communications device 110) or other devices (for example, a server) over a communication network 120.

Figure 2:
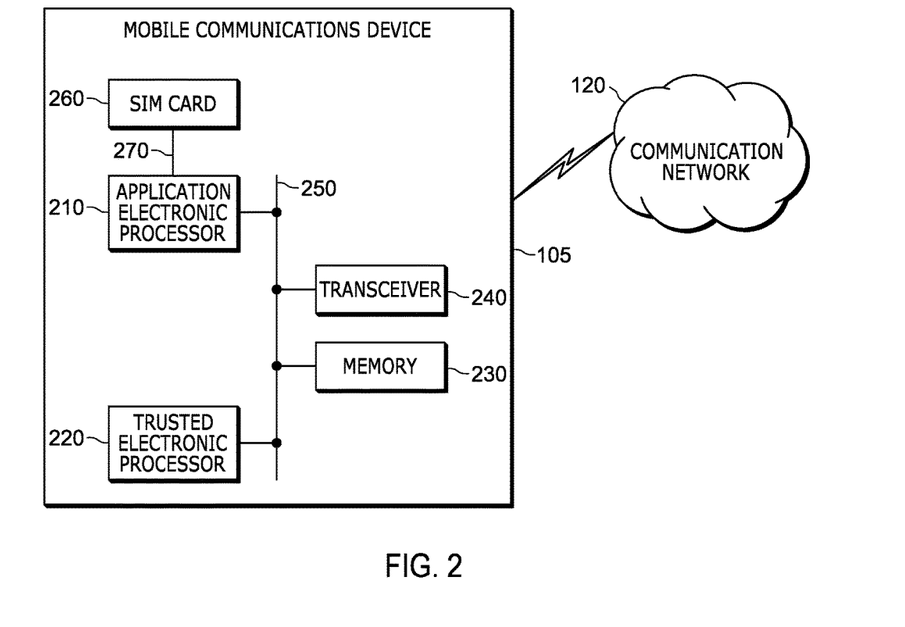
FIG. 2 is a diagram of a mobile communications device belonging to the group of mobile communications devices of FIG. 1 in accordance with some embodiments.

FIG. 2 is a diagram of one embodiment of a mobile communications device 105. The mobile communications device 105 may be, for example, a two-way radio, a smart telephone, a tablet computer, and the like. In the example illustrated, the mobile communications device 105 includes an application electronic processor 210, a trusted electronic processor 220, a memory 230, and a transceiver 240. The application electronic processor 210, the trusted electronic processor 220, the memory 230, and the transceiver 240 communicate over one or more control and/or data buses (for example, a communication bus 250). The mobile communications device 105 may also include a SIM card 260, which may be removable by a user of the mobile communications device 105. The SIM card 260 is connected to the application electronic processor 210 over a communication link 270. FIG. 2 illustrates only one exemplary embodiment of a mobile communications device 105. The mobile communications device 105 may include more or fewer components and may perform functions other than those explicitly described herein.

In some embodiments, the application electronic processor 210 is implemented as a microprocessor with separate memory, such as the memory 230. In other embodiments, the application electronic processor 210 may be implemented as a microcontroller (with memory 230 on the same chip). In other embodiments, the application electronic processor 210 may be implemented using multiple processors. In addition, the application electronic processor 210 may be implemented partially or entirely as, for example, a field-programmable gate array (FPGA), an applications specific integrated circuit (ASIC), and the like and the memory 230 may not be needed or be modified accordingly. The trusted electronic processor 220 may be implemented similar to the application electronic processor 210. The trusted electronic processor 220 is a dedicated processor that performs security functions such as authentication and the like of the mobile communications device 105. While, the application electronic processor 210 performs other functions of the mobile communications device 105. In the example illustrated, the memory 230 includes non-transitory, computer-readable memory that stores instructions that are received and executed by the application electronic processor 210, the trusted electronic processor 220, or both to carry out the functionality of the mobile communications device 105 described herein. The memory 230 may include, for example, a program storage area and a data storage area. The program storage area and the data storage area may include combinations of different types of memory, such as read-only memory and random-access memory.

The transceiver 240 enables wireless communication between the mobile communications device 105 and the communication network 120, which may be associated with the SIM card 260 used in the mobile communications device 105. In some embodiments, rather than a transceiver 240 the mobile communications device 105 may include separate transmitting and receiving components, for example, a transmitter and a receiver.

The communication network 120 may be a wired or wireless communication network, such as a cellular network, a land mobile radio (LMR) network, or the like operated by a network operator. The communication network 120 may be used by organizations, such as public safety organizations, to provide services to users associated with an incident, such as a public safety incident.

As described above, the SIM card 260 is provided by a network operator to allow the mobile communications devices 105 using the SIM card 260 to communicate over the communication network 120 operated by the network operator. The SIM card 260 may be implemented similar to the application electronic processor 210 and the trusted electronic processor 220 as described above. In the example illustrated, the SIM card 260 communicates with the trusted electronic processor 220 via the application electronic processor 210. The SIM card 260 communicates with the application electronic processor 210 over a communication link 270. The application electronic processor 210 communicates with the trusted electronic processor 220 over the communication bus 250 as described above.

The SIM card 260 may be associated with the group of mobile communications devices 100. Accordingly, the SIM card 260 may operate only in the group of mobile communications devices 100 that the SIM card 260 is associated with. When a SIM card 260 is inserted into a mobile communications device 105, the mobile communications device 105 and the SIM card 260 perform an authentication operation to determine whether the SIM card 260 is associated with the group of mobile communications devices 100 to which the mobile communications device 105 belongs.

The authentication operation performed between the mobile communications device 105 and the SIM card 260 may be a public-key authentication. The SIM card 260 includes a random value generator and stores a hash function and a first key (for example, a public key). All SIM cards authorized to work on the group of mobile communications devices 100 may include the same hash function and the same first key. The mobile communications device 105 stores a second key (for example, a private key) in the trusted electronic processor 220. All mobile communications devices 105 that are part of the group of mobile communications devices 100 may store the same second key.

Figure 3:
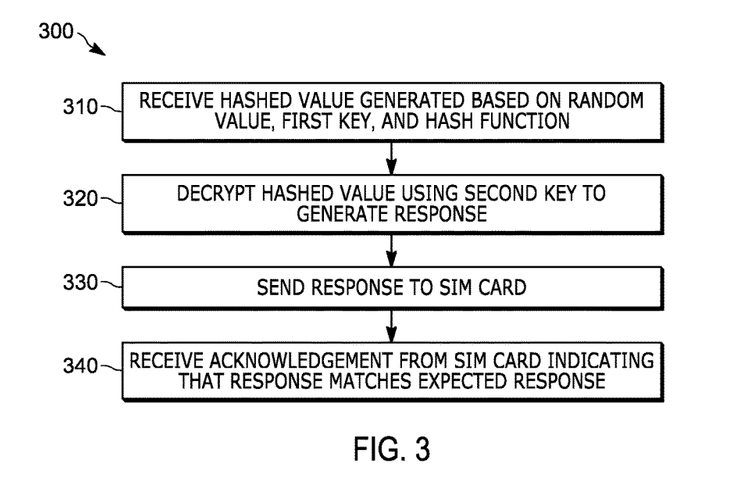
FIG. 3 is a flowchart illustrating a method for associating the SIM card of FIG. 2 with a group of mobile communications devices.

FIG. 3 is a flowchart illustrating one example method 300 for associating a SIM card 260 to a group of mobile communications devices 100. As illustrated in FIG. 3, the method 300 includes receiving, at the trusted electronic processor 220, a hashed value generated based on a random value, the first key, and the hash function (at block 310). When the SIM card 260 is inserted into the mobile communications device 105, the SIM card 260 initiates the authentication operation. The SIM card 260 generates a random value using the random number generator. The random value may be a random string or a random number. The SIM card 260 then uses the random value and the first key as inputs to the hash function to generate the hashed value. The hashed value is sent to the application electronic processor 210 over the communication link 270. The trusted electronic processor 220 receives the hashed value over the communication bus 250.

The method 300 also includes decrypting, using the trusted electronic processor 220, the hashed value using the second key to generate a response (at block 320). For example, the trusted electronic processor 220 may store a decryption function that decrypts the hashed value using the second key to generate the response.

The method 300 also includes sending, using the trusted electronic processor 220, the response to the SIM card 260 (at block 330). The trusted electronic processor 220 sends the response to the application electronic processor 210 over the communication bus 250. The application electronic processor 210 sends the response to the SIM card 260 over the communication link 270.

The SIM card 260 receives the response from the trusted electronic processor 220 and compares the response to the expected response. When the response sent by application electronic processor 210 matches an expected response, SIM card 260 sends an acknowledgement indicating the match to the trusted electronic processor 220. Thus, when a match is found, the trusted electronic processor 220 receives an acknowledgement from the SIM card 260 indicating that the response matches an expected response (at block 340). The SIM card 260 may also store the decryption algorithm and the second key to generate the expected response. The SIM card 260 may generate the expected response around the same time the hashed value is sent to the trusted electronic processor 220. In some embodiments, rather than generating the random value and the expected response, the SIM card 260 stores a list of random values and corresponding expected responses. The SIM card 260 selects a random value from the list of random values to generate the hashed value and compares the received response to an expected response corresponding to the selected random value. In other embodiments, the expected response is the random value used to generate the hashed value. Accordingly, the trusted electronic processor 220 extracts the original random value from the hashed value using the decryption function and the second key and sends the original random value to the SIM card 260. In some embodiments, the SIM card 260 may begin a timer for a timeout period when the hashed value is sent to the trusted electronic processor 220.

When the response matches the expected response, the SIM card 260 sends the acknowledgement to the trusted electronic processor 220. The acknowledgement is sent to the trusted electronic processor 220 over the communication link 270 and the communication bus 250 via the application electronic processor 210 as described above. When the response does not match the expected response or when the response is not received within the timeout period, the SIM card 260 sends a negative acknowledgement to the trusted electronic processor 220. The negative acknowledgement is sent to the trusted electronic processor 220 over the communication link 270 and the communication bus 250 via the application electronic processor 210 as described above.

In some embodiments, when the mobile communications device 105 receives a positive acknowledgement from the SIM card 260, the mobile communications device 105 connects to the communication network 120 associated with the SIM card 260. Connecting to the communication network 120 allows the mobile communications device 105 to communicate with other mobile communications devices 105 or with application servers over the communication network 120. In some embodiments, when the mobile communications device 105 receives a positive acknowledgement from the SIM card 260, the mobile communications device 105 registers with the communication network 120 using the SIM card 260. Registering with the communication network 120 includes exchanging identification information with the network operator of the communication network 120. Upon registering with the communication network 120, the mobile communications device 105 may connect to the communication network 120 as described above.

In some embodiments, when the mobile communications device 105 receives a negative acknowledgement from the SIM card 260, the mobile communications device 105 establishes a limited connection with the communication network 120 associated with the SIM card 260. Establishing the limited connection may entail, for example, only allowing a user to make emergency call from the mobile communications devices 105 over the communication network 120. In some embodiments, when the mobile communications device 105 receives a negative acknowledgement from the SIM card 260, the mobile communications device 105 fails to connect with the communication network 120 associated with the SIM card 260. Accordingly, the mobile communications device 105 may be prevented from communicating with other mobile communications devices 105 or accessing application servers over the communication network 120.

Figure 4:
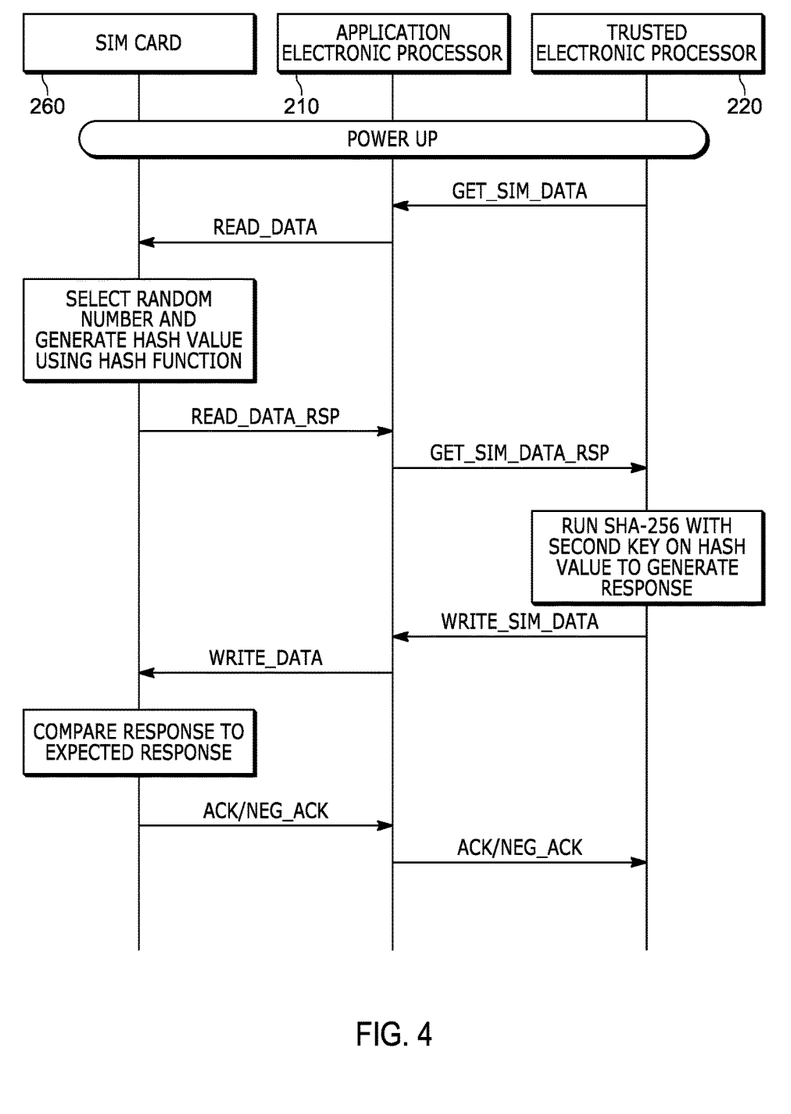
FIG. 4 is a flow diagram illustrating a method for associating the SIM card of FIG. 2 with a group of mobile communications devices.

For example, FIG. 4 is an operation flow diagram illustrating association of the SIM card 260 with the group of mobile communications devices 100. When a SIM card 260 is inserted into the mobile communications device 105, the trusted electronic processor 220 sends a GET_SIM_DATA command to the application electronic processor 210 requesting the application electronic processor 210 to get a hashed value from the SIM card 260. In response, the application electronic processor 210 performs a READ_DATA operation on an authentication application installed on the SIM card 260. In response to the READ_DATA command, the authentication application may generate a random value or select a random value from a list of random values to generate a hashed value using a hash function and a first key stored on the SIM card 260. In the example illustrated, the hash function may be a Secure Hash Algorithm (SHA) and the first key is a Secure Hash Algorithm 256 bit key (SHA256).

The SIM card 260 provides the hashed value to the application electronic processor 210 as a response to the READ_DATA command, that is, READ_DATA_RSP. The application electronic processor 210 in turn provides the hashed value to the trusted electronic processor 220 as a response to the GET_SIM_DATA command, that is, GET_SIM_DAT_RSP. Upon receiving the hashed value, the trusted electronic processor 220 runs a Secure Hash Algorithm (SHA-256) on the hashed value using a second key stored in the trusted electronic processor 220 to generate a response.

The trusted electronic processor 220 sends a WRITE_SIM_DATA command along with the response to the application electronic processor 210 requesting the application electronic processor 210 to write the response to the SIM card 260. The application electronic processor 210 in turn performs a WRITE DATA operation and sends the response to the authentication application. The authentication application compares the response to an expected response, which may be stored in the authentication application or may be generated by the authentication application.

When the response matches the expected response, the authentication application sends a positive acknowledgement using an ACK command to the application electronic processor 210, which in turn sends the positive acknowledgement to the trusted electronic processor 220. On the other hand, when the response does not match the expected response or when the response is not received within a timeout period, the authentication application sends a negative acknowledgement using a NEG_ACK command to the application electronic processor 210, which in turn sends the negative acknowledgement to the trusted electronic processor 220.

Figure 5:
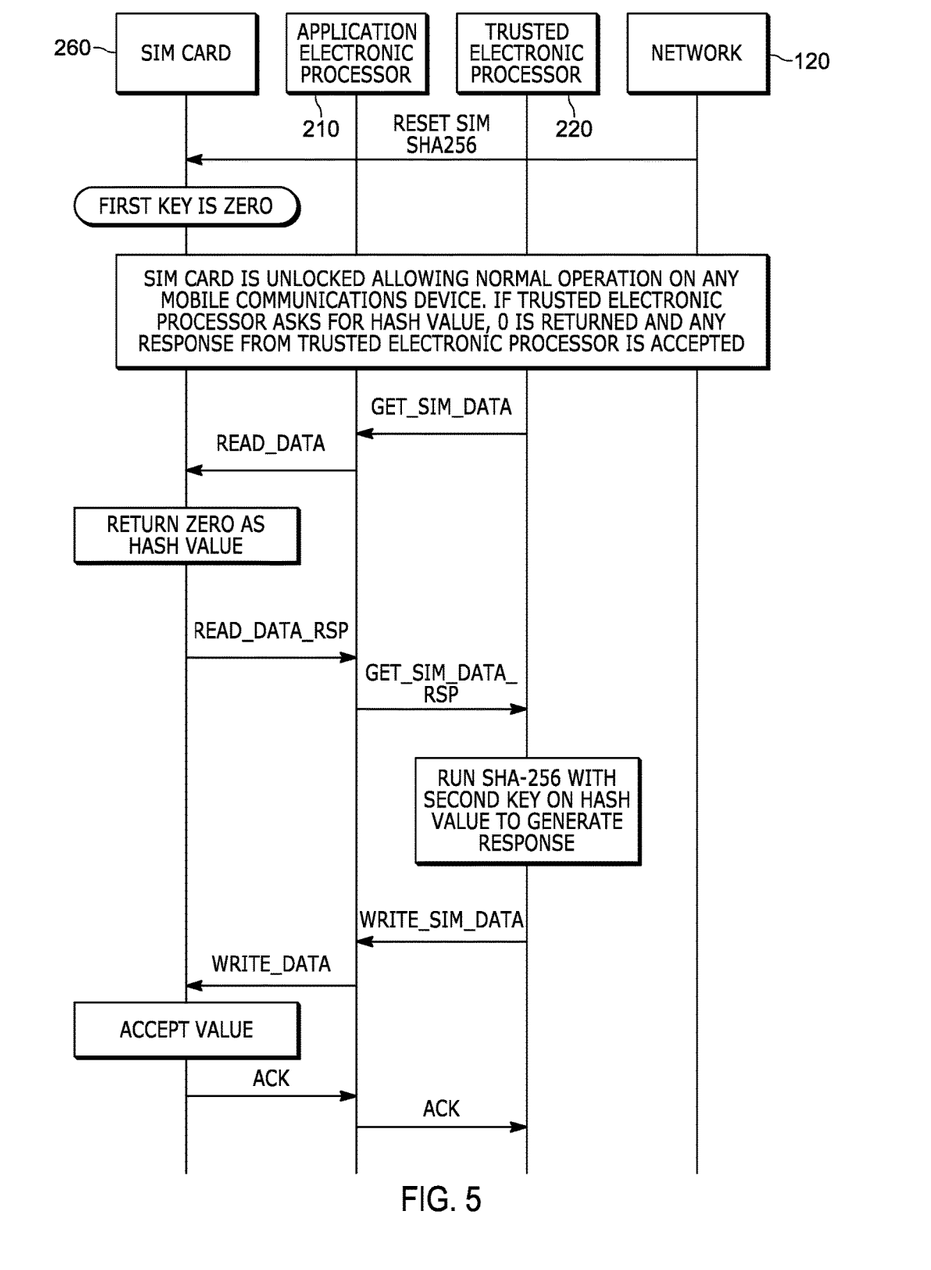
FIG. 5 is a flow diagram illustrating a method of disabling an association of the SIM card of FIG. 2 with a group of mobile communications devices.

FIG. 5 is an operation flow diagram illustrating an example of resetting an association of the SIM card 260 with the group of mobile communications devices 100. In the example provided, the network operator sends a RESET SIM SHA256 command to the SIM card 260 over the communication network 120 operated by the network operator to disable the association of the SIM card 260 with the group of mobile communications devices 100. The RESET SIM SHA256 command is received by the application electronic processor 210 via the transceiver 240 and passed on to the SIM card 260 over the communication link 270. In one example, the application electronic processor 210 receives a disable signal (that is, RESET SIM SHA256) from the network operator and disables a security feature of the SIM card 260 after receiving the disable signal. Upon receiving the RESET SIM SHA256 command, the SIM card 260 resets the first key to zero and configures the authentication application to send a value indicating zero as the hashed value and to send a positive acknowledgement to any response received from the trusted electronic processor 220. When the SIM card 260 resets the first key, normal operation of the SIM card 260 on any mobile communications device 105 is allowed even if the mobile communications device 105 is not part of the group of mobile communications devices 100 (that is, not authorized by the organization) (for example, mobile communications device 105 from FIG. 1).

When the trusted electronic processor 220 requests the hashed value (for example, a second hashed value) from the SIM card 260 as described above, the trusted electronic processor 220 receives a value indicating zero as the second hashed value. The trusted electronic processor 220 decrypts the second hashed value to generate a second response. Subsequently, when the second response is sent to the SIM card 260, the trusted electronic processor 220 receives a positive acknowledgement (for example, a second acknowledgement) ACK from the SIM card 260.

Figure 6:
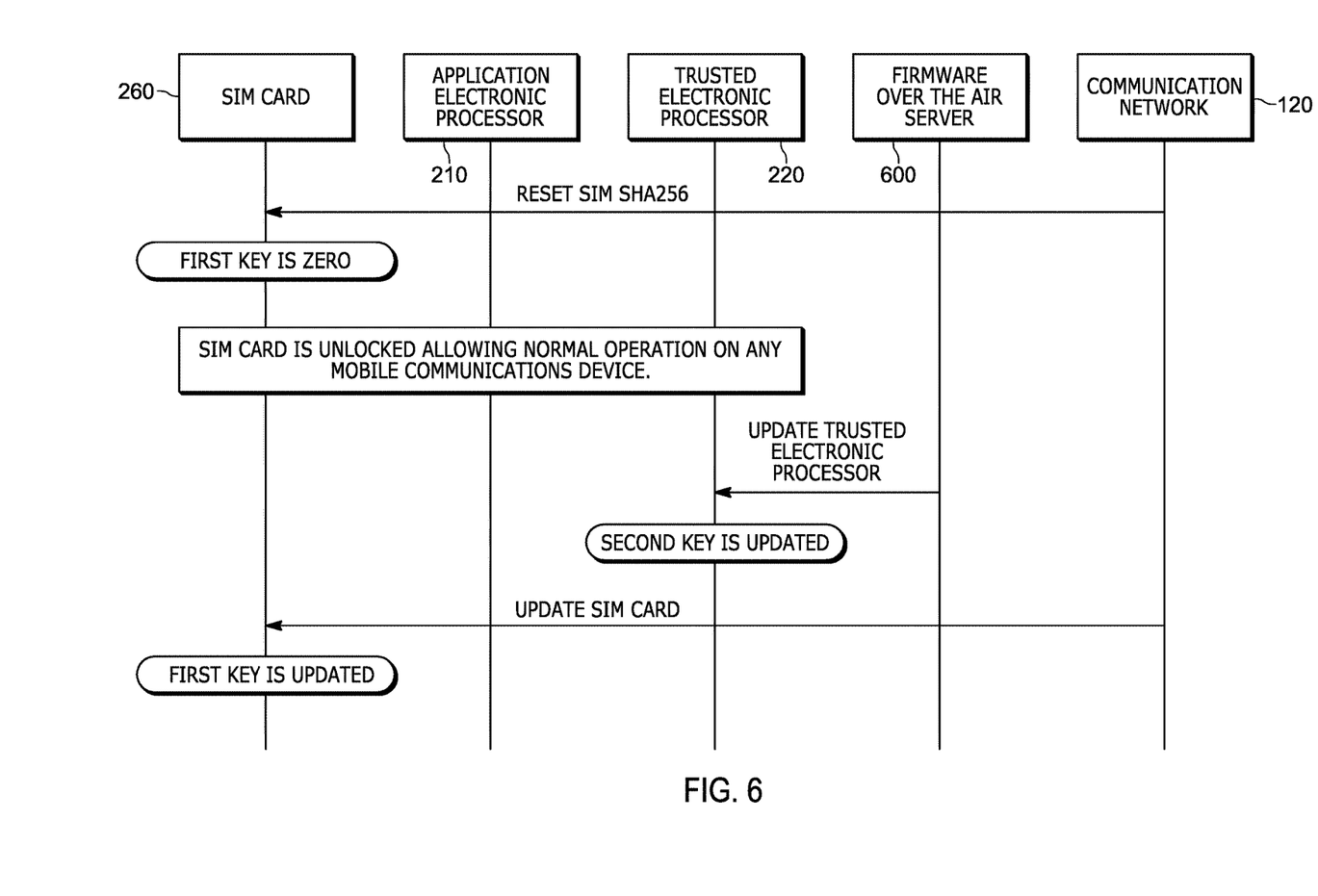
FIG. 6 is a flow diagram illustrating a method of updating a first key of the SIM card of FIG. 2 and a second key of the mobile communications device of FIG. 1.

FIG. 6 is an operation flow diagram of a method of updating the first key of the SIM card 260 and the second key of the mobile communications device 105. In order to update the first key and the second key, a reset operation may first be performed on the SIM card 260. As described above, the network operator may send a RESET SIM SHA256 command to the SIM card 260 over the communication network 120 operated by the network operator. The RESET SIM SHA256 command may be received by the application electronic processor 210 via the transceiver 240 and passed on to the SIM card 260 over the communication link 270. Upon receiving the RESET SIM SHA256 command, the SIM card 260 resets the first key to zero. Accordingly, the SIM card 260 is unlocked and may operate on any mobile communications device 105, even if the mobile communications device 105 does not belong to the group of mobile communications devices 100.

Once the first key is reset, the firmware provider or the organization may push an update over the firmware over the air server to the mobile communications device 105 to update the second key. The trusted electronic processor 220 modifies the second key to a new second key when the mobile communications device 105 receives the update from the firmware provider or the organization. The new second key is provided as part of the update from the firmware provider or the organization.

The network provider may then push an update over the communication network 120 to the SIM card 260 to update the first key. The SIM card 260 modifies the first key to a new first key when the mobile communications device 105 receives the update from the network provider. The new first key is provided as part of the update from the network provider.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A mobile communications device comprising:
   an application electronic processor; and
   a trusted electronic processor coupled to the application electronic processor and configured to:
      receive, from a subscriber identity module (SIM) card, a hashed value generated based on a random value, a first key, and a hash function,
      decrypt the hashed value using a second key to generate a response,
      send the response to the SIM card, and
      receive an acknowledgement from the SIM card indicating that the response matches an expected response.

2. The mobile communications device of claim 1, wherein the application electronic processor is configured to:
   in response to receiving the acknowledgement from the SIM card indicating that the response matches the expected response, connect to a communication network associated with the SIM card.

3. The mobile communications device of claim 1, wherein the application electronic processor is configured to:
   in response to receiving the acknowledgement from the SIM card indicating that the response matches the expected response, register to a communication network associated with the SIM card.

4. The mobile communications device of claim 1, wherein the expected response is the random value.

5. The mobile communications device of claim 1, wherein the trusted electronic processor is further configured to:
   receive a negative acknowledgement from the SIM card indicating that the response does not match the expected response.

6. The mobile communications device of claim 1, wherein the trusted electronic processor is further configured to:
   receive a negative acknowledgement from the SIM card indicating that the response is not received within a timeout period.

7. The mobile communications device of claim 1, wherein the application electronic processor is further configured to:
   receive a disable signal from a network operator; and
   disable a security feature of the SIM card after receiving the disable signal.

8. The mobile communications device of claim 7, wherein disabling the security feature of the SIM card further comprises:
   receiving a value indicating zero as a second hashed value from the SIM card;
   decrypting the second hashed value using the second key to generate a second response;
   sending the second response to the SIM card; and
   receiving a positive acknowledgement from the SIM card.

9. The mobile communications device of claim 7, wherein the trusted electronic processor is further configured to:
   receive an update from a firmware provider, the update including a new second key; and
   in response to receiving the update, modify the second key to the new second key.

10. A method for associating a subscriber identity module (SIM) card to a group of mobile communications devices, the method comprising;
    receiving, at a trusted electronic processor of a mobile communications device, a hashed value from the SIM card, the hashed value generated based on a random value, a first key stored on the SIM card, and a hash function;
    decrypting, using the trusted electronic processor, the hashed value based on a second key stored on the mobile communications device to generate a response;
    sending, using the trusted electronic processor, the response to the SIM card, and
    receiving, at the trusted electronic processor, an acknowledgement from the SIM card indicating that the response matches an expected response.

11. The method of claim 10, further comprising:
    in response to receiving the acknowledgement from the SIM card indicating that the response matches the expected response, connecting to a communication network associated with the SIM card.

12. The method of claim 10, further comprising:
    in response to receiving the acknowledgement from the SIM card indicating that the response matches the expected response, registering to a communication network associated with the SIM card.

13. The method of claim 10, wherein the expected response is the random value.

14. The method of claim 10, further comprising:
    receiving a negative acknowledgement from the SIM card indicating that the response does not match the expected response.

15. The method of claim 10, further comprising:
    receiving a negative acknowledgement from the SIM card indicating that the response is not received within a timeout period.

16. The method of claim 10, further comprising:
receiving a disable signal from a network operator; and
disabling a security feature of the SIM card after receiving the disable signal.

17. The method of claim 16, wherein disabling the security feature of the SIM card further comprises:
receiving a value indicating zero as a second hashed value from the SIM card;
decrypting the second hashed value using the second key to generate a second response;
sending the second response to the SIM card; and
receiving a positive acknowledgement from the SIM card.

18. The method of claim 16, further comprising:
receiving an update from a firmware provider, the update including a new second key; and
in response to receiving the update, modifying the second key to the new second key.

* * * * *